United States Patent [19]

Stockman

[11] E Re. 29,126

[45] Reissued Jan. 25, 1977

[54] WOUND CAPACITOR

[75] Inventor: Robert Michael Stockman, Brookfield Center, Conn.

[73] Assignee: American Radionic Co., Inc., Danbury, Conn.

[22] Filed: Dec. 24, 1975

[21] Appl. No.: 644,189

Related U.S. Patent Documents

Reissue of:

[64] Patent No.: 3,792,323
Issued: Feb. 12, 1974
Appl. No.: 360,056
Filed: May 14, 1973

[52] U.S. Cl. ..... 317/260; 317/242
[51] Int. Cl.[2] ..... H01G 1/14
[58] Field of Search ..... 317/242, 260

[56] References Cited

FOREIGN PATENTS OR APPLICATIONS

| | | | |
|---|---|---|---|
| 142,350 | 7/1951 | Australia | 317/260 |
| 197,985 | 3/1952 | Switzerland | 317/260 |

OTHER PUBLICATIONS

Dummer, "Fixed & Variable Capacitors," McGraw-Hill, N.Y., 1960, pp. 89 & 90.

*Primary Examiner*—E. A. Goldberg
*Attorney, Agent, or Firm*—Buckles and Bramblett

[57] ABSTRACT

There is disclosed a wound capacitor which is designed to open an external circuit upon capacitor failure. This is accomplished by dividing the foil at each end of the capacitor into two regions. A lead is then connected to each region so that the completed capacitor has a total of four leads. The two leads at each end of the capacitor become a part of the external circuit. A capacitor failure thereby causes an open in the external circuit.

11 Claims, 5 Drawing Figures

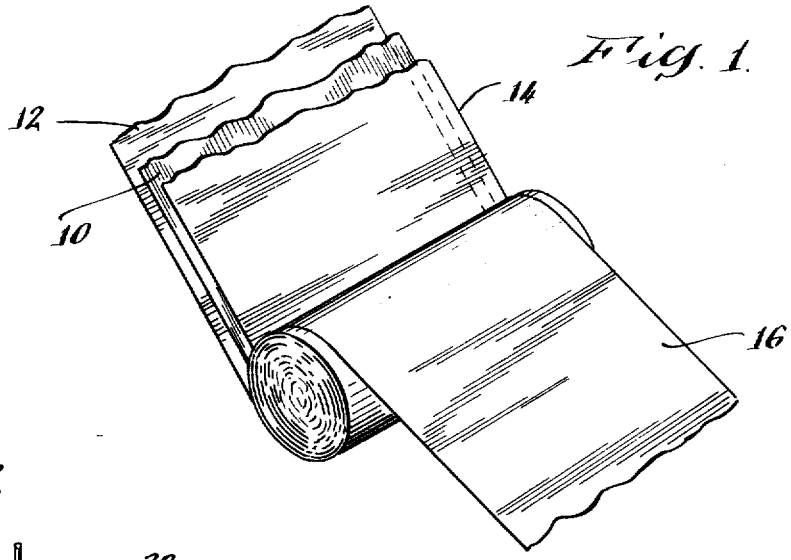
Fig. 1.
Fig. 2.
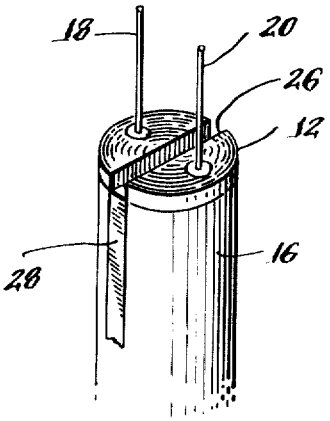
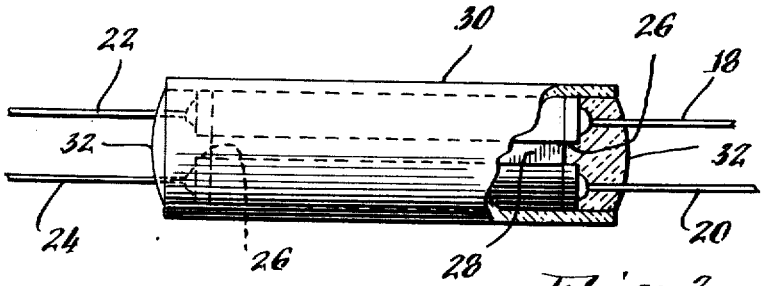
Fig. 3.
Fig. 4.
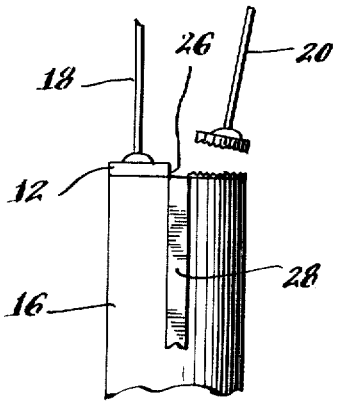
Fig. 5.
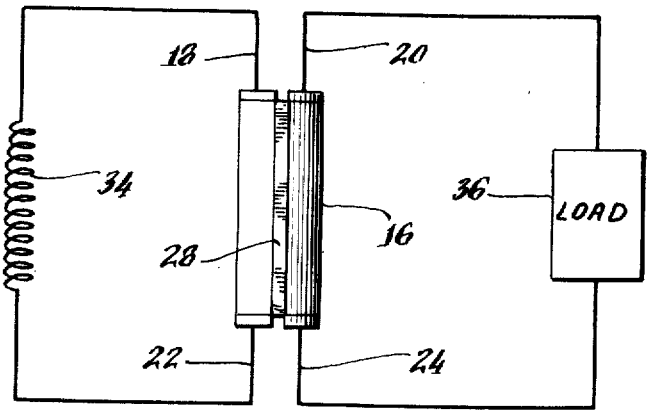

WOUND CAPACITOR

Matter enclosed in heavy brackets[ ] appears in the original patent but forms no part of this reissue specification; matter printed in italics indicates the additions made by reissue.

BACKGROUND OF THE INVENTION

Certain type of circuits require the presence of a capacitor for purposes of safety. One such circuit is the circuit energizing a color television tube. A capacitor is required across this circuit in order to supress harmful radiation from the tube. In the absence of such a capacitor, the tube may emit radiation which can cause severe harm to living things. In the past, if a capacitor in such a circuit exhibited certain failure modes, the main circuit would act as if there were no capacitor at all and it would then emit radiation. These failure modes were either a complete open, an intermittent open or physical removal of the capacitor from the circuit. By "intermittent" is meant a situation in which a lead is broken away from the capacitor but, under certain circumstances such as temperature variations or vibration, will make contact.

Accordingly, it is a primary object of the present invention to provide a capacitor which, upon failure, will disable the main circuit. Other objects are to provide such a capacitor which will so disable a circuit upon the occurrence of a break between the capacitor lead and winding; upon an intermittent break; upon occurrence of a broken or cut lead; upon complete removal of the capacitor from the circuit; and upon removal of the capacitor winding leaving the leads and end fill still intact.

The manner in which the foregoing objects are achieved will be apparent from the following description and appended claims.

SUMMARY OF THE INVENTION

An improvement in a wound capacitor of the type having first and second conductive plates separated by a dielectric, the first plate being exposed at one end and the second plate being exposed at the other end of the capacitor. The improvement comprises provision of at least two leads connected to the plate exposed at each end of the capacitor. The leads are secured to the plate in spaced relationship to each other.

BRIEF DESCRIPTION OF THE DRAWING

With particular reference to the drawing:

FIG. 1 illustrates a wound capacitor partially unrolled to illustrate its construction;

FIG. 2 illustrates one end of a capacitor winding in accordance with this invention;

FIG. 3 illustrates a completed capacitor in accordance with the invention, partially broken away to illustrate its internal construction;

FIG. 4 illustrates a failure mode of a capacitor in accordance with the invention; and FIG. 5 illustrates diagrammatically the manner in which a capacitor in accordance with this invention is connected to a load.

DESCRIPTION OF THE PREFERRED EMBODIMENT

There is illustrated in FIG. 1 a partially unrolled capacitor comprising a dielectric film or sheet 10 separating foil 12 forming a first capacitor plate and a foil 14 forming a second capacitor plate. The foils are staggered so that, after being rolled, the foil 12 extends from the left end of the capacitor as viewed in FIG. 1, while the foil 14 extends from the right end of the capacitor. A second dielectric 16 also separates the foils and encircles the completed capacitor to form an outer wrapping.

In a conventional capacitor, a single lead would be soldered to the foil at each end of the rolled capacitor. In the case of aluminum foil, a technique called "swedging" is used. Aluminum solder is applied to the foils under heat and pressure, thereby permitting a lead to be attached using additional solder. Various welding processes are also in use for attaching the leads to aluminum foil. In accordance with the present invention, however, two leads are connected to each end of the capacitor in spaced relation to one another. Thus, as seen in FIG. 2, the leads 18 and 20 are soldered to the foil 12. A corresponding pair of leads 22, 24 are similarly attached to the opposite end of the capacitor. Further, in the manufacture of a capacitor in accordance with the invention, a portion of the foil intermediate the leads 18, 20 is removed to form a slot 26. The slot 26 extends to a depth even with the edge of the dielectric 10, 16. Thereafter, an insulating tape 28 is wrapped lengthwise around the capacitor and through the slot 26 in one end and the corresponding slot in the other. Thereafter, the capacitor is encapsulated. This may be done as shown in FIG. 3, for example, by means of a porcelain tube 30 and a suitable end fill 32, such as an epoxy, as shown in FIG. 3.

The manner in which the capacitor of this invention is employed to protect a circuit is illustrated in FIG. 5, which illustrates a power source such as a transformer winding 34 and a load 36 to be protected which may include, as explained above, a television tube. It is important to note that when the capacitor of this invention is connected into a circuit as disclosed in FIG. 5, the leads of the capacitor become a part of the load circuit itself. It will thus be apparent that if, for example, one lead 20 were to pull away from the capacitor as shown in FIG. 4, this would constitute an open circuit in the load itself and thereby prevent it from operating. A similar result would occur from an intermittent open, a broken lead, complete removal of the capacitor from the circuit, or complete removal of the capacitor winding leaving the leads and end fills still intact. The presence of the slot 26 and tape 28, prevents any "bridging" foil from remaining between the leads 18, 20 in the event they are singly or simultaneously detached from the capacitor.

It is believed that the many advantages of this invention will now be apparent to those skilled in the art. It will also be apparent that a number of variations and modifications may be made in this invention without departing from its spirit and scope. For example, various types of capacitor windings might be employed such as, for example, a metallized construction wherein each plate is a deposit of metal applied directly to the dielectric. Accordingly, the foregoing description should be construed as illustrative only, rather than limiting. This invention is limited only by the scope of the following claims.

I claim:

1. In a wound capacitor of the type having first and second conductive plates separated by a dielectric, the first plate being exposed at one end, and the second plate being exposed at the other end, of the capacitor, the improvement which comprises: at least two leads connected to the plate exposed at each end of said capacitor, said leads being secured to the plate in spaced relationship to each other, the exposed plate at each end defining a slot between said leads.

2. The capacitor of claim 1 wherein each of said slots includes an insulating tape extending therethrough.

3. The capacitor of claim 1 wherein said slot is substantially filled with an insulating material.

4. In a wound capacitor of the type having first and second conductive plates separated by a dielectric, the first plate being exposed at one end, and the second plate being exposed at the other end, of the capacitor, said dielectric encircling the fully wound capacitor with its edges displaced inwardly from the exposed edges of said plates, the improvement which comprises: at least two leads connected to the plate exposed at each end of said capacitor the exposed plate at each end defining a slot between said leads having a depth substantially equal to the exposed portion of said plates.

5. The capacitor of claim 4 wherein each of said slots includes an insulating tape extending therethrough.

6. The capacitor of claim 4 wherein said slot is substantially filled with an insulating material.

7. In a wound capacitor of the type including first and second metallic foil strips separated by first and second dielectric strips, one of said dielectric strips encircling the fully wound capacitor but having said first foil strip exposed at one end thereof and the second foil strip exposed at the other end, the improvement which comprises: two leads connected to the foil exposed at each end of said capacitor in spaced relationship to each other; a slot between said leads defined by the foil at each end of said capacitor, and having a depth substantially equal to the exposed projection of foil; and insulating means enclosing said capacitor and substantially filling each of said slots but leaving the leads exposed.

8. The capacitor of claim 7 wherein each of said slots includes an insulating tape extending therethrough.

9. In a wound capacitor of the type having first and second conductive plates separated by a dielectric, the first plate being exposed at one end, and the second plate being exposed at the other end, of the capacitor, the improvement which comprises: at least two leads connected to the plate exposed at an end of said capacitor, said leads being secured to the plate in spaced relationship to each other, said exposed plate defining a slot between said leads.

*10. In a wound capacitor of the type having a body including first and second conductive plates separated by a dielectric, the first plate being exposed at one end, and the second plate being exposed at the other end, of the capacitor, the improvement which comprises: at least two leads connected to the plate exposed at an end of said capacitor body, said leads being secured to the plate in spaced relationship to each insulating means encapsulating said capacitor body with said leads extending therethrough other separation and means extending sustantially diametrically across the end of said capacitor body intermediate said leads and intermediate said plate and insulating means for preventing conductive material bridging said leads upon detachment of a lead from said capacitor.*

*11. In a wound capacitor of the type having first and second conductive plates separated by a dielectric, the first plate being exposed at one end, and the second plate being exposed at the other end, of the capacitor, the improvement which comprises: at least two leads connected to the plate exposed at each end of said capacitor, said leads being secured to the plate in spaced relationship to each other, and means including an insulated tape for preventing conductive plate material bridging said leads upon detachment of a lead from said capacitor.*

* * * * *

UNITED STATES PATENT OFFICE

CERTIFICATE OF CORRECTION

Patent No. RE 29,126 Dated January 25, 1977

Inventor(s) Robert Michael Stockman

It is certified that error appears in the above-identified patent and that said Letters Patent are hereby corrected as shown below:

Col. 4, line 23, after "each" insert --other;--; line 25, delete "other separation and" and insert therefor -- and separation--.

Signed and Sealed this

Twelfth Day of April 1977

[SEAL]

*Attest:*

RUTH C. MASON
*Attesting Officer*

C. MARSHALL DANN
*Commissioner of Patents and Trademarks*